US008025110B2

(12) United States Patent
Falgout, Jr. et al.

(10) Patent No.: US 8,025,110 B2
(45) Date of Patent: Sep. 27, 2011

(54) MOTOR SHAFT SECURITY APPARATUS

(76) Inventors: Thomas E. Falgout, Jr., Lafayette, LA (US); Chad M. Daigle, Lafayette, LA (US)

( * ) Notice: Subject to any disclaimer, the term of this patent is extended or adjusted under 35 U.S.C. 154(b) by 16 days.

(21) Appl. No.: 12/321,827

(22) Filed: Jan. 26, 2009

(65) Prior Publication Data
US 2010/0187013 A1 Jul. 29, 2010

(51) Int. Cl.
*E21B 4/00* (2006.01)
*E21B 19/18* (2006.01)
(52) U.S. Cl. .......................... 175/101; 175/106
(58) Field of Classification Search ............. 175/104, 175/106, 107, 101
See application file for complete search history.

(56) References Cited

U.S. PATENT DOCUMENTS

| 2,025,259 | A | * | 12/1935 | Zublin ........................ 175/337 |
| 4,693,326 | A | * | 9/1987 | Bodine ......................... 175/55 |
| 7,445,061 | B1 | | 11/2008 | Falgout, Jr. et al. |
| 2010/0314172 | A1 | * | 12/2010 | Underwood et al. .......... 175/57 |

* cited by examiner

*Primary Examiner* — David Andrews

(57) ABSTRACT

A down hole drilling motor shaft security apparatus is disclosed. The apparatus has a general body housing threadedly attached to a lower radial bearing housing and an output shaft extending from the lower radial bearing housing. Within the general body housing is a thrust bearing assembly that secures a portion of the output shaft within the general body housing and the lower radial bearing housing. An intermediate sleeve having a capture groove of an elongated predetermined width is threadedly attached to the output shaft. An interference structure that is secured to the general housing extends radially into the capture groove in a manner that prevents axial loads from being transmitted to the intermediate sleeve from the interference structure while the bearing assembly is intact. The interference structure is configured to secure the intermediate sleeve and the output shaft to the general housing by engagement with the capture groove of the intermediate sleeve in the event of axial movement of the intermediate sleeve a preselected amount.

20 Claims, 4 Drawing Sheets

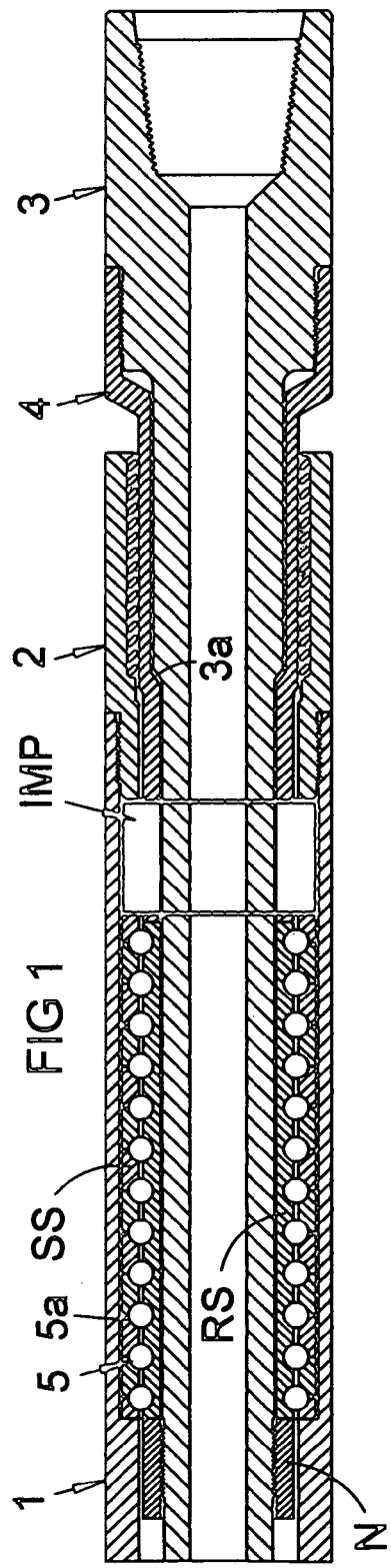
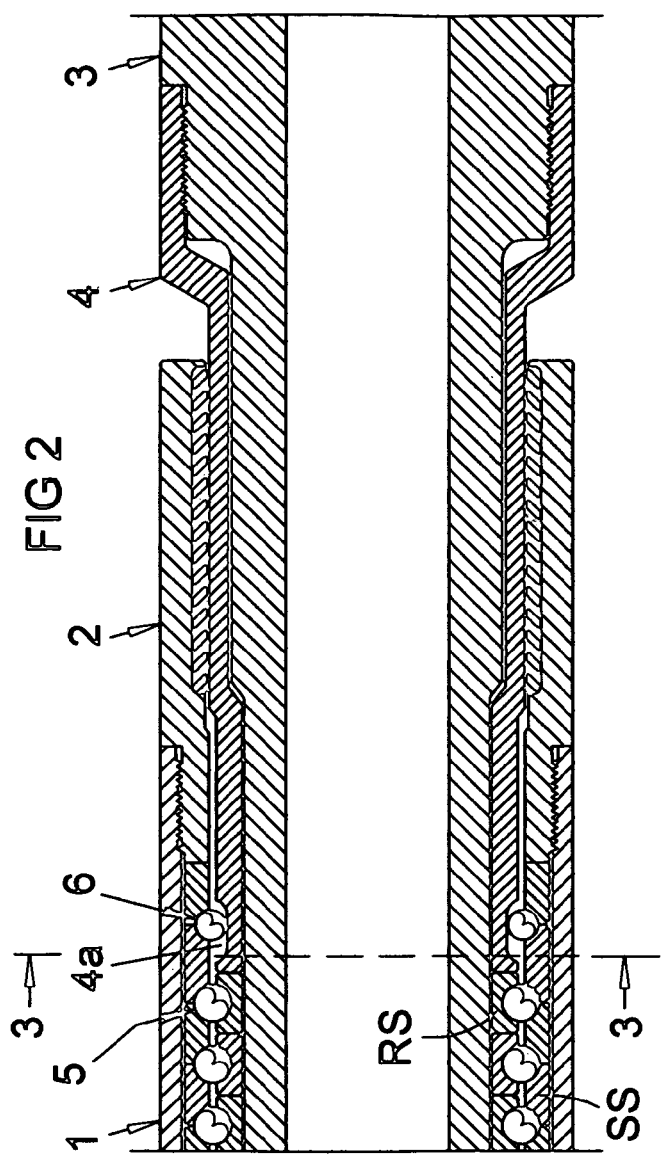
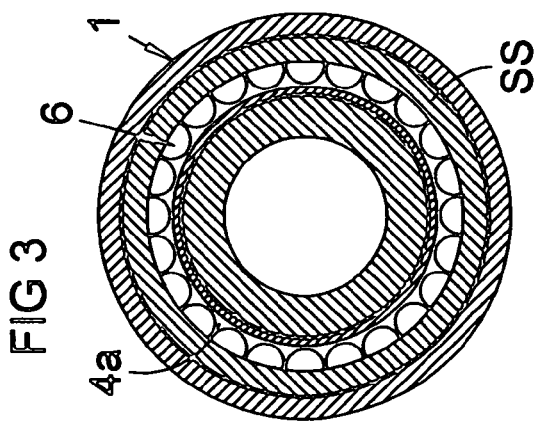

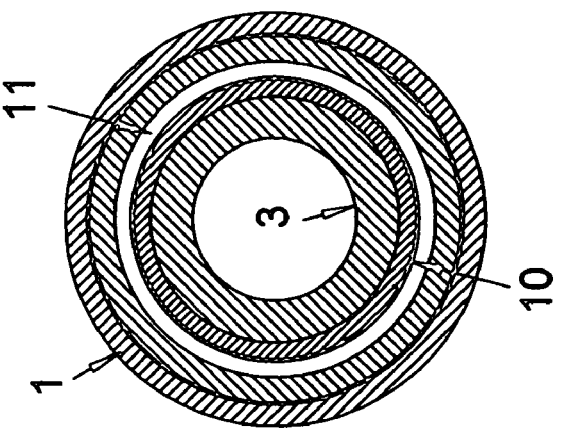
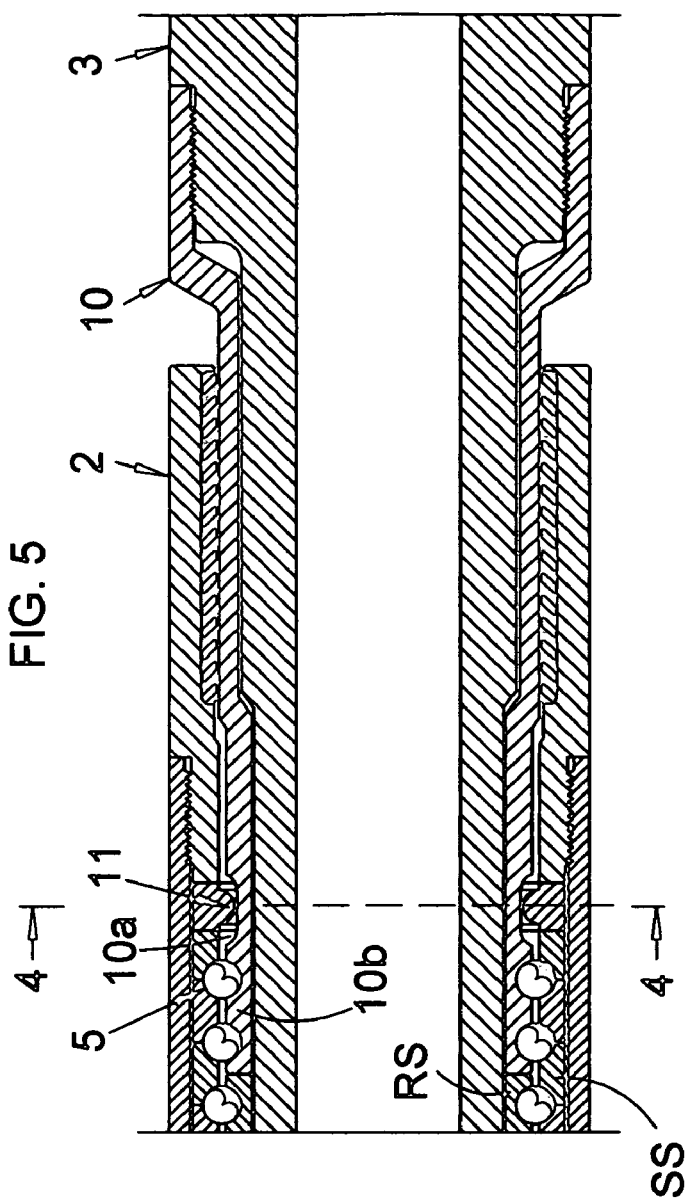

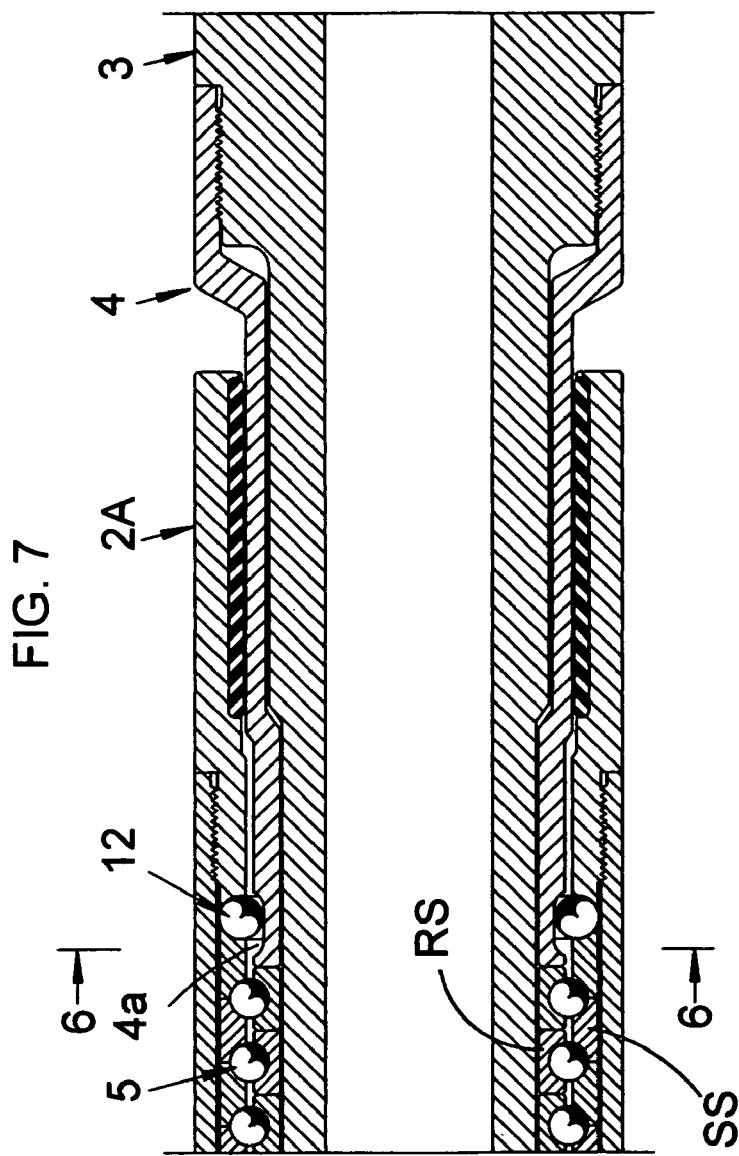
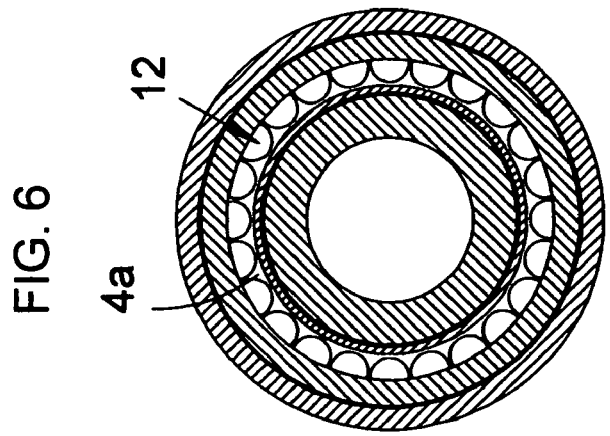

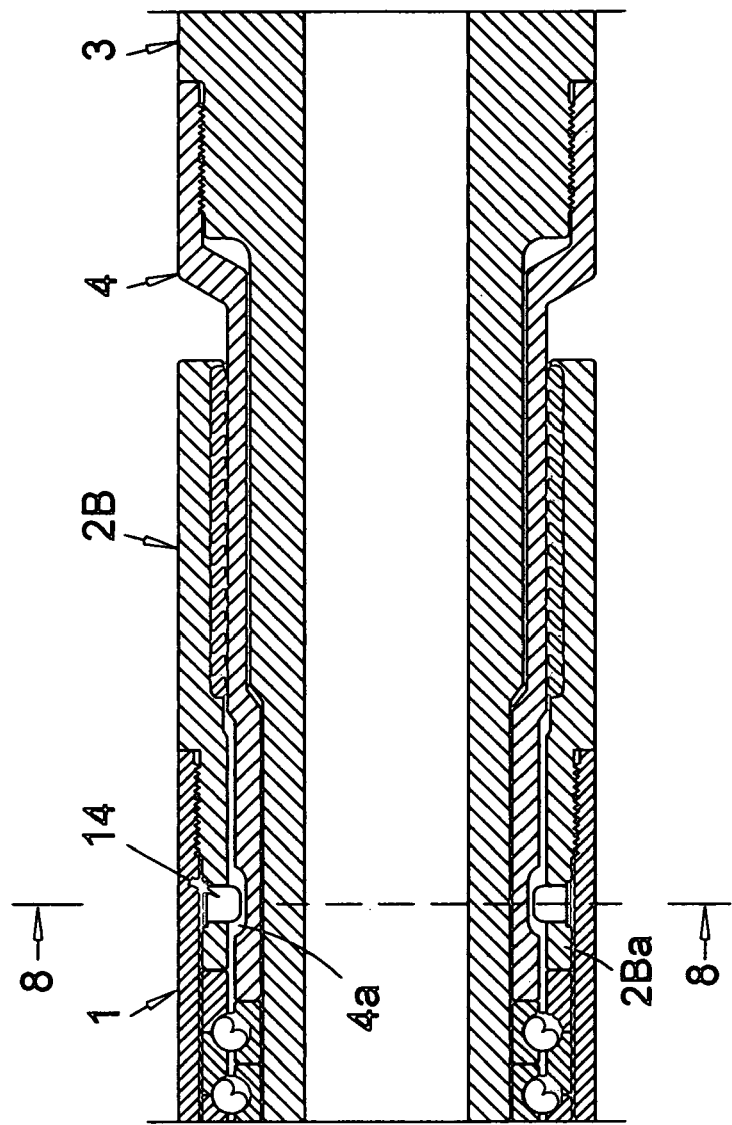
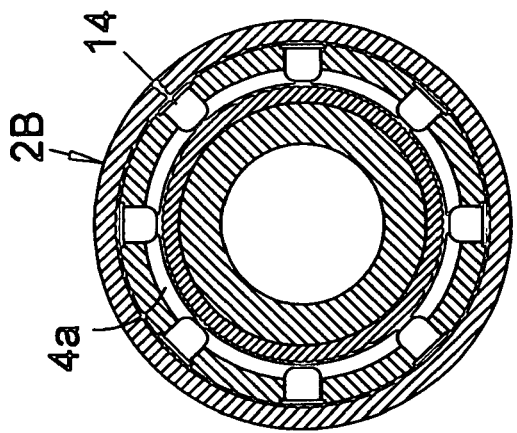

MOTOR SHAFT SECURITY APPARATUS

This invention pertains to down hole motors. More particularly, it pertains to structure that secures the motor as a single assembly, for recovery from a well bore, if some parts fail.

RELATIONSHIP TO OTHER PATENTS

This invention is an improvement upon the U.S. Pat. No. 7,445,061 issued to the present applicants, and present assignee on Nov. 4, 2008. That patent is made part of this application by reference herein.

BACKGROUND OF THE INVENTION

Drilling motors are used as part of a drill string, near the drill head, to drive the drill head rotationally relative to the upwardly continuing drill string. The drilling fluid flow is usually used to power the motor. Drilling motors are often used on coiled tubing which cannot be rotated. In some cases the motor is used to rotationally attach the drill string to hardware down hole that is to be recovered by tension forces. Jars are sometimes used to deliver shock to the hardware. Motors that are designed for drilling are sometimes not designed to accept axial shock forces.

Axial shock loads imposed upon motors can separate their Output drive shafts. The usual structure of motors includes capture rings that will usually extract all of the output shaft when the damaged motor is removed from the well. The part of the output shaft that extends outside the motor body is about the size of the body. The shaft diameter decreases before the capture contrivance can engage the shaft. If the shaft breaks below the capture device, debris is left in the well.

The U.S. Pat. No. 7,445,061 issued Nov. 4, 2008 provided a sleeve that engaged the largest part of the output shaft and extended upward to engage at least some of the thrust bearings. That enabled the recovery of all motor parts and the bit even if the shaft broke below the capture device.

During the use of drilling motors, the motors may be miles below the surface and the evidence of failing bearings may not be realized until the bearings are destroyed and the supported shaft drops out of the motor. The cited patent depends upon bearings to support the output shaft and these bearings too can fail totally. The present improvement can function independently of any bearings. Further, the friction of the preferred configuration makes the motor have to produce more torque, or stall, when the bearings have failed. This additional torque can be detected in the form of a mud pressure jump at the stand pipe. The machine can be stopped before the capture device is destroyed.

SUMMARY OF THE DISCLOSURE

A sleeve is threadedly secured to the projecting end of the motor output shaft and extends into the motor housing, up to the lower end of the thrust bearing assembly. Optional arrangement includes some thrust bearing races in the sleeve.

At the top end of the sleeve, a peripheral capture groove receives a stator mounted interference structure that will not allow the sleeve to pass through axially.

These and other objects, advantages, and features of this invention will be apparent to those skilled in the art from a consideration of this specification, including the attached claims and appended drawings.

BRIEF DESCRIPTION OF DRAWINGS

FIG. 1 is a side view, in cut-away, of a prior art embodiment of the apparatus to which the improvement pertains. The area to which the improvement applies is captioned IMP. Body 1 has bearing housing 2 which captures the stator components of bearings 5. Sleeve 4 transmits forces from the IMP area to the enlarged end of the output shaft 3.

FIG. 2 is a side view, mostly cut away, of the major components in the vicinity of the improvement, and of one version of the improvement itself.

FIG. 3 is a section taken along line 3-3 of FIG. 2. Balls 6 are allowed to roll in the peripheral groove or race 4a.

FIG. 4 is a section taken along line 4-4.

FIG. 5 is a side view, mostly in cut-away, of the improved portion of the apparatus.

FIG. 6 is a sectional view taken along line 6-6 of FIG. 7.

FIG. 7 is a side view, mostly in cut-away, of an alternate form of the apparatus.

FIG. 8 is a sectional view taken along line 8-8 of FIG. 9.

FIG. 9 is a side view, mostly in cut-away of an alternate form of the apparatus.

DETAILED DESCRIPTION OF DRAWINGS

In the down hole motor art, a general down hole motor housing may consist of several parts. In function, however, the assembled general housing attaches to a drill string, supports a confined motor and has a lower radial bearing housing which forms a housing closure from which an output shaft extends to engage and drive a drill bit.

FIG. 1 shows the lower end of a drilling motor according to prior art, excepting the area, IMP, shown in a heavy dashed rectangle. The present improvement is, preferably, installed in the area of that rectangle. No power producing structure is shown. A power producing assembly is normally situated in the upper end of tube 1, above the limit of FIG. 1, and drives the output shaft 3, which has an enlarged diameter output end, through an attachment situated above (left of) nut N. The general body housing 1 is threadedly attached to lower radial bearing housing 2 by threads. The thrust bearing assembly is comprised of a stator stack of bearings comprised of outer race stack SS which defines outer races 5a and a rotor stack comprised of inner race stack RS which carries bearing balls 5. The body housing 1 compresses the stator stack of bearings. The rotor stack of thrust bearings is usually compressed by nut N, unless they are keyed to the shaft 3. Sleeve 4 is threadedly attached to the shaft 3 at the large diameter end.

Sleeve 4 can stress the shaft 3 in compression if it bears on the shaft shoulder 3a. If the sleeve 4 does not bear on the shaft shoulder 3a, the nut N, by compressing the rotor stack RS, can stress the shaft 3 in tension under the sleeve 4. The choice of the nature of the stress is usually dictated by expected drilling conditions.

FIG. 2 shows one construction option for an improvement to the down hole motor apparatus shown in FIG. 1. The improvement is comprised of an interference structure comprised of interference balls 6 that are engaged in a ball race at the lower end the outer race stack SS. The interference balls 6 are configured to be received within an inner groove or race 4a in sleeve 4. The balls 6 are free to rotate peripherally in inner race 4a of the sleeve 4. However, the inner race 4a of the sleeve 4 has a predetermined elongated width that prevents axial loads from being transmitted to sleeve 4 by the balls 6 while the thrust bearings remain intact. If the thrust bearings fail, the inner race stack RS and sleeve 4 will move axially with respect to said housing 2. If such movement occurs, the balls 6 will axially trap the edge of groove 4a of said sleeve 4 to limit movement of the RS stack, sleeve 4 and said drive shaft 3 to a space within the predetermined width of groove 4a and the prevent the ejection of the drive shaft 3 and attached sleeve 4 from the housing 2.

FIG. 3 is a section taken along line 3-3 of FIG. 2.

FIG. 4 is a section taken along line 4-4 of FIG. 5.

FIG. 5 shows an alternate construction option for the improvement to the down hole motor apparatus shown in FIG. 1. As shown in FIG. 5, an interference ring 11 is provided at the end of the stator stack of bearings to replace the balls 6. The interference ring 11 is configured to be received within a radial capture groove 10a in sleeve 10 which is threadably attached to drive shaft 3. The capture groove boa has a predetermined elongated width that prevents axial loads from being transmitted to the sleeve 10 from the interference ring 11 while the thrust bearings remain intact. If the thrust bearings fail, the inner race stack RS and sleeve 10 will move axially with respect to the housing 2 and the ring bb will axially capture groove boa in the sleeve 10 to limit movement of the RS stack, sleeve 10 and said drive shaft 3 within the predetermined width of groove ma of the sleeve 10 and prevent the ejection of the drive shaft 3 and attached sleeve 10 from the housing 2.

FIG. 5 also shows an optional extension 10b of the sleeve, now captioned 10. This extension 10b provides space on sleeve 10, in addition to that provided for elongated groove 10a, for at least one race to receive balls 5 as at least part of the thrust bearing stack. This option should be construed to apply to the assemblies according to FIGS. 2, 7, and 9.

FIG. 6 is a section taken along line 6-6 of FIG. 7.

FIG. 7 shows an improvement to the down hole motor apparatus similar to that shown in FIG. 2. However, in this configuration the balls 12 are held firmly in the stator stack by the radial bearing housing, now captioned 2A, and cannot move peripherally. The balls 12 are distributed about inner race 4a, of a predetermined width, in sleeve 4 in a manner that prevents axial loads from being transmitted to the sleeve 4 from the balls 12 while the thrust bearings remain intact. In the event the thrust bearings fail, the inner race stack RS and sleeve 4 will move axially with respect to the housing 2A and a non-rotating structure, the balls 12, will engage and axially capture race 4a in sleeve 4. Such engagement will limit movement of the RS stack, sleeve 4 and said drive shaft 3 within the predetermined width of groove 4a and the prevent the ejection of the drive shaft 3 and sleeve 4 from the housing 2A and a change in torque experienced by the motor due to such engagement will yield a drilling fluid pressure change to be detected at the surface to signal for motor shut down.

FIG. 8 is a section taken along line 8-8 of FIG. 9.

FIG. 9 shows a plurality of pins 14 peripherally distributed through bores in the extended, non-threaded, part 2Ba of the radial bearing housing, now captioned 2B. The pins 14 serve the same purpose as the non-rotating balls 12 of FIG. 7 in that they engage and axially capture race 4a in the sleeve 4 and produce drag after thrust bearing failure. The increased torque demanded of the motor due to the engagement of the pins 14 with the capture race 4a will be detectable as stand pipe pressure change detectable at the surface. Eight pins are shown but any practical number of pins may be installed.

From the foregoing, it will be seen that this invention is one well adapted to attain all of the ends and objects hereinabove set forth, together with other advantages which are obvious and which are inherent to the apparatus.

It will be understood that certain features and sub-combinations are of utility and may be employed without reference to other features and sub-combinations. This is contemplated by and is within the scope of the claims.

As many possible embodiments may be made of the apparatus of this invention without departing from the scope thereof, it is to be understood that all matter herein set forth or shown in the accompanying drawings is to be interpreted as illustrative and not in a limiting sense.

The invention having been explained, We claim:

1. A down hole drilling motor shaft security apparatus, the apparatus comprising:
    a) a down hole motor with a housing, an output shaft having an extending portion extending from said housing, and a bearing assembly securing said output shaft within said housing;
    b) an intermediate sleeve threadedly attached to an enlarged portion of said extending portion of said output shaft, said intermediate sleeve having a capture groove therein, said capture groove having an elongated predetermined width extending axially with respect to said output shaft; and
    c) an interference structure, said interference structure secured to said housing and situated within said elongated width of said capture groove in a manner that prevents axial loads from being transmitted to said sleeve from said interference structure while said bearing assembly is intact and whereby said interference structure will engage said capture groove of said intermediate sleeve to retain said output shaft if said bearing assembly fails and said intermediate sleeve moves a preselected axial distance relative to said housing.

2. The apparatus of claim 1 wherein spherical elements axially secured to said housing comprise said interference structure.

3. The apparatus of claim 2 wherein said spherical elements are balls free to roll peripherally in a housing supported race.

4. The apparatus of claim 1, wherein said interference structure is a ring that extends radially into said capture groove.

5. The apparatus of claim 1 wherein said interference structure comprises pins extending radially from said housing into said capture groove.

6. The apparatus of claim 1 wherein said intermediate sleeve is extended to include at least one race as part of said bearing assembly.

7. A down hole drilling motor shaft security apparatus, comprising:
    a) a down hole motor with a housing and an output shaft, said output shaft having an extended portion extending from said housing, said output shaft secured to said housing by bearings;
    b) an intermediate sleeve threadedly attached to said extended portion of said output shaft, said intermediate sleeve having at least one capture groove, said capture groove having an elongated predetermined width extending axially with respect to said output shaft; and
    c) means for engaging said capture groove of said intermediate sleeve in the event of axial movement of said sleeve a preselected amount whereby axial loads are prevented from being transmitted to said intermediate sleeve while said bearing assembly is intact.

8. The apparatus of claim 7 wherein said means for engaging said capture groove includes rolling elements supported within said housing.

9. The apparatus of claim 7 wherein said means for engaging said capture groove includes a ring that extends radially into said capture groove.

10. The apparatus of claim 7 wherein said means for engaging said capture groove includes pins extending radially from said housing into said capture groove.

11. The apparatus of claim 10 wherein said pins are secured to said general housing by extending from a radial bearing housing which is part of said housing.

12. The apparatus of claim 7 wherein said means for engaging said capture groove includes balls peripherally distributed, and secured against rotation, within said housing.

13. A down hole drilling motor shaft security apparatus, comprising:
 a) a general body housing;
 b) a lower radial bearing housing threadedly attached to said general body housing;
 c) an output shaft having an extended portion extending from said lower radial bearing housing;
 d) a thrust bearing assembly securing a portion of said output shaft within said general body housing and said lower radial bearing housing, said thrust bearing assembly having a stator stack of bearings comprised of an outer race stack that defines a plurality of outer races and a corresponding rotor stack that defines an inner race stack which carry a plurality of bearing balls;
 e) an intermediate sleeve threadedly attached to said extended portion of said output shaft, said intermediate sleeve having at least one capture groove, said capture groove having an elongated predetermined width that extends axially with respect to said output shaft; and
 f) an interference structure, secured to said general housing and extending radially into said capture groove in a manner that prevents axial loads from being transmitted to said intermediate sleeve from said interference structure while said bearing assembly is intact, said interference structure configured to secure said intermediate sleeve and said output shaft to said general housing by engagement with said capture groove of said intermediate sleeve in the event of axial movement of said intermediate sleeve a preselected amount.

14. The apparatus of claim 13 wherein said interference structure includes balls free to roll peripherally in a race formed in said lower radial bearing housing.

15. The apparatus of claim 13 wherein said interference structure is a ring that extends radially into said capture groove.

16. The apparatus of claim 13 wherein said interference structure comprises pins extending radially from said lower radial bearing housing into said capture groove.

17. The apparatus of claim 16 wherein said intermediate sleeve is extended to include at least one race and bearing ball combination as part of said bearing assembly.

18. The apparatus of claim 13 wherein said interference structure comprises balls extending into said capture groove from said lower radial bearing housing, said balls fixed against peripheral movement in said lower radial bearing housing.

19. The apparatus of claim 18 wherein said intermediate sleeve is extended to include at least one race and bearing ball combination as part of said bearing assembly.

20. The apparatus of claim 13 wherein said intermediate sleeve is extended to include at least one race and bearing ball combination as part of said bearing assembly.

* * * * *